(12) United States Patent
Chen et al.

(10) Patent No.: US 8,761,076 B2
(45) Date of Patent: Jun. 24, 2014

(54) METHOD FOR REALIZING DATA FORWARDING, NETWORK SYSTEM, AND DEVICE

(75) Inventors: Weimin Chen, Chendu (CN); Gaoquan Lin, Shenzhen (CN); Saixiang Fu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 155 days.

(21) Appl. No.: 13/246,965

(22) Filed: Sep. 28, 2011

(65) Prior Publication Data

US 2012/0014314 A1 Jan. 19, 2012

Related U.S. Application Data

(63) Continuation of application No. PCT/CN2009/071062, filed on Mar. 30, 2009.

(51) Int. Cl.
*H04N 7/14* (2006.01)
*H04W 84/04* (2009.01)
*H04L 1/18* (2006.01)
*H04W 28/06* (2009.01)

(52) U.S. Cl.
CPC .......... *H04W 84/047* (2013.01); *H04W 28/06* (2013.01); *H04L 1/1887* (2013.01)
USPC ........................................ 370/315

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS

| 6,189,039 | B1 * | 2/2001 | Harvey et al. ................. 709/232 |
| 8,478,903 | B2 * | 7/2013 | Farber et al. ................. 709/245 |

(Continued)

FOREIGN PATENT DOCUMENTS

| CN | 101009612 A | 8/2007 |
| CN | 101147346 | 3/2008 |

(Continued)

OTHER PUBLICATIONS

International Search Report for PCT/CN2009/071062, mailed Jan. 14, 2010.

(Continued)

*Primary Examiner* — Jung-Jen Liu
(74) *Attorney, Agent, or Firm* — Staas & Halsey LLP (57) ABSTRACT

A method for realizing data forwarding, a network system, and a related device are provided. The method includes: receiving data sent from an external device; and judging whether the data is from or to a backhaul terminal, and directly forwarding the data if the data is from or to the backhaul terminal. A Base Station (BS) device includes: a receiving module, configured to receive data sent from an external device; a backhaul judging module, configured to judge whether the data is from or to a backhaul terminal; and a sending module, configured to directly forward the data after the backhaul judging module judges that the data is from or to the backhaul terminal. A backhaul terminal and a network system are further correspondingly provided. Accordingly, transmission bandwidth is saved through the provided technical solutions.

11 Claims, 4 Drawing Sheets

(56) References Cited

U.S. PATENT DOCUMENTS

| | | |
|---|---|---|
| 2003/0223395 A1* | 12/2003 | Chitrapu ................... 370/338 |
| 2004/0062214 A1* | 4/2004 | Schnack et al. ............ 370/315 |
| 2008/0013513 A1* | 1/2008 | Kurokawa .................. 370/338 |
| 2008/0080414 A1* | 4/2008 | Thubert et al. ............. 370/328 |
| 2010/0103861 A1* | 4/2010 | Ulupinar et al. ............ 370/315 |
| 2011/0165878 A1* | 7/2011 | Nylander et al. ........... 455/436 |
| 2012/0044908 A1* | 2/2012 | Spinelli et al. .............. 370/331 |

FOREIGN PATENT DOCUMENTS

| | | |
|---|---|---|
| CN | 101147346 A | 3/2008 |
| EP | 1786217 | 5/2007 |
| WO | 2005/004409 | 1/2005 |
| WO | WO 2005/004409 A1 | 1/2005 |
| WO | 2007/041931 A1 | 4/2007 |
| WO | 2009/009511 A2 | 1/2009 |
| WO | 2009/050659 A2 | 4/2009 |

OTHER PUBLICATIONS

Written Opinion of the International Searching Authority, mailed Jan. 14, 2010, in International Application No. PCT/CN2009/071062 (5 pp.).

First Chinese Office Action mailed May 15, 2013 in corresponding Chinese Patent Application No. 200980100665.7 (7 pages) (5 pages English Translation).

European Search Report dated Nov. 30, 2011 issued in corresponding European Patent Application No. 09842476.5.

Chinese Office Action dated Dec. 13, 2013 in corresponding Chinese Application No. 200980100665.7 (6 pages).

* cited by examiner

METHOD FOR REALIZING DATA FORWARDING, NETWORK SYSTEM, AND DEVICE

CROSS-REFERENCE TO RELATED APPLICATIONS

This application is a continuation of International Application No. PCT/CN2009/071062, filed on Mar. 30, 2009, which is hereby incorporated by reference in its entirety.

FIELD OF THE INVENTION

The present invention relates to the field of communications technologies, and in particular, to a method for realizing data forwarding, a network system, and a device.

BACKGROUND OF THE INVENTION

At present, the 3rd Generation (3G) mobile communication technology is widely used, and a 4th Generation (4G) mobile communication technology will emerge in the future. However, both the 3G mobile network and the future 4G mobile network will encounter some problems, for example, poor terminal access quality at the edge of cellular cell coverage, existing of coverage hole and coverage blind area, and poor indoor coverage. To solve these problems, main technical solutions proposed at present include relay technology, repeater technology, and backhaul technology.

The backhaul technology may employ a wireless backhaul transmission manner. The wireless backhaul transmission manner uses a wireless-mode mobile terminal and a Base Station (BS) as transmission bearers in the same or different wireless mode, that is, the wireless backhaul transmission manner uses two stages of the same wireless access link or different wireless access links at the same wireless mode or different wireless modes are cascaded. In the wireless backhaul transmission manner, in terms of Wideband Code Division Multiple Access (WCDMA), Long Term Evolution (LTE), or Worldwide Interoperability for Microwave Access (WiMAX) system, a target is to realize backhaul transmission while the impact on the existing protocols are lowered as much as possible.

Figure 1:
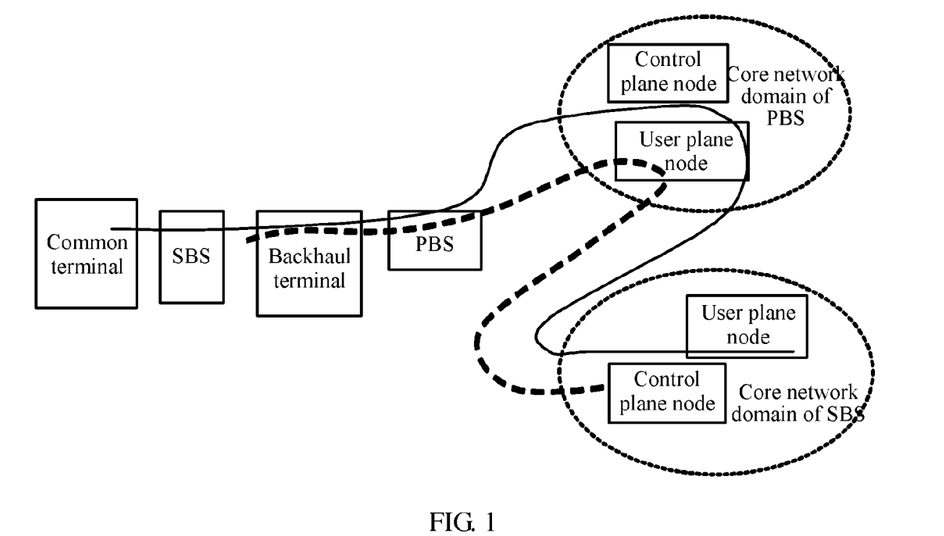
FIG. 1 is a schematic diagram for performing data forwarding by using a wireless backhaul transmission manner in the prior art.

FIG. 1 is a schematic diagram of performing data forwarding by using a wireless backhaul transmission manner in the prior art.

In a solution as shown in FIG. 1, it is assumed that core network elements of a Primary BS (PBS) and a Secondary BS (SBS) are logically separated, that is, all data streams from the SBS transparently pass through the PBS and the core network element of the PBS, and are then transmitted to the core network element belonging to the SBS. The PBS is, for example, an eNB, and the SBS is, for example, a Pico or a Femto.

As shown in FIG. 1, a common terminal, an SBS, a backhaul terminal, a PBS, core network elements of the PBS (including a control plane node (for example, a Mobility Management Entity (MME)) and a user plane node (for example, a Serving-Gateway (S-GW) and a PDN-Gateway (P-GW)), and core network elements of the SBS (including a control plane node and a user plane node) are included. In FIG. 1, a dashed line represents a control plane signaling flow, and a solid line represents a user plane data stream.

The backhaul terminal is a special common terminal, and mainly serves for transmission and relay in a network.

When the data (for example, the user plane data stream or the control plane signaling flow) sent from the SBS is transmitted to the PBS through the backhaul terminal, the PBS performs tunnel encapsulation on the data, and transmits the data to the core network element of the PBS, and then the data is transparently transmitted to the core network element of the SBS. The user plane data stream passes through the core network elements being the S-GW and the P-GW of the PBS, and is then transmitted to the core network elements being the S-GW and the P-GW of the SBS. The control plane signaling flow passes through the core network elements being the S-GW and the P-GW of the PBS, and is then transmitted to the core network element being the MME of the SBS. In addition, as for data sent from the core network element to the backhaul terminal, the PBS needs to perform tunnel decapsulation on the data, and then sends the data to the backhaul terminal.

During the researching and practicing of the prior art, the inventors find that the prior art has the following problems.

In the prior art, when data sent from the SBS passes through the PBS, the data needs to be performed one-time tunnel encapsulation. As a result, waste of transmission bandwidth is caused by tunnel encapsulation.

SUMMARY OF THE INVENTION

To solve the technical problem, embodiments of the present invention provide a method for realizing data forwarding, a network system, and a related device, so as to save the transmission bandwidth.

A method for realizing data forwarding includes:

receiving data sent from an external device; and judging whether the data is from or to a backhaul terminal, and directly forwarding the data if the data is from or to the backhaul terminal.

A Base Station includes:

a receiving module, configured to receive data sent from an external device;

a backhaul judging module, configured to judge whether the data is from or to a backhaul terminal; and a sending module, configured to directly forward the data after the backhaul judging module judges that the data is from or to the backhaul terminal.

A Base Station includes:

a receiving module, configured to receive data sent from an external device;

a code point labeling module, configured to perform code point labeling on the data; and a sending module, configured to send the data with the code point labeling.

A backhaul terminal includes:

a receiving module, configured to receive data with code point labeling;

a classifying and mapping module, configured to classify and map the data with the code point labeling to a corresponding radio bearer according to a of a code point value obtained after the code point labeling is performed; and a sending module, configured to send the data classified and mapped by the classifying and mapping module.

A network system includes:

a backhaul terminal, configured to send or receive data; and a Primary Base Station, configured to receive data sent from an external device; judge whether the data is from or to the backhaul terminal, and directly forward the data if the data is from or to the backhaul terminal.

It can be seen from the technical solutions that, in the technical solutions according to embodiments of the present invention, after the data is judged to be the data from the backhaul terminal, the data is directly forwarded without tunnel encapsulation; and after the data is judged to be the data to the backhaul terminal, the data is directly forwarded without tunnel decapsulation. Therefore, the bandwidth waste is reduced, and the transmission bandwidth is saved.

BRIEF DESCRIPTION OF THE DRAWINGS

To illustrate the technical solutions according to the embodiments of the present invention or in the prior art more clearly, the accompanying drawings are described below for the embodiments of the present invention or the prior briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE EMBODIMENTS

The technical solutions of the present invention will be clearly and fully described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

An embodiment of the present invention provides a method for realizing data forwarding, so as to save the transmission bandwidth.

Figure 2:
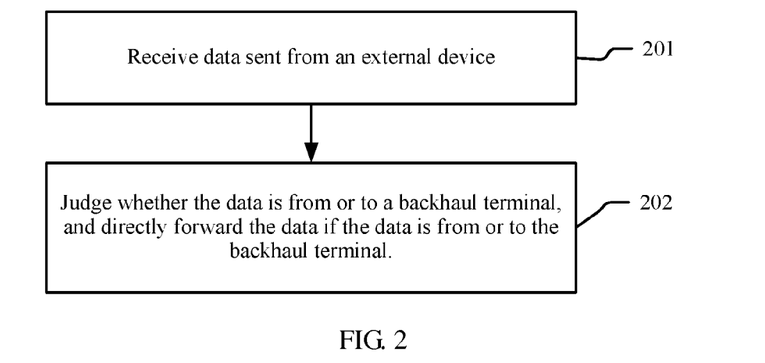
FIG. 2 is a flow chart of a data forwarding method according to an embodiment of the present invention.

FIG. 2 is a flow chart of a data forwarding method according to an embodiment of the present invention. As shown in FIG. 2, the method includes the following steps.

Step 201: Receive data sent from an external device.

A PBS receives data sent from an external device, where the data may be from or to a backhaul terminal.

Step 202: Judge whether the data is from or to a backhaul terminal, and directly forward the data if the data is from or to the backhaul terminal.

The PBS judges whether the data is from the backhaul terminal, and directly forwards the data to a core network element of an SBS without tunnel encapsulation, if the data is judged to be the data from the backhaul terminal.

The PBS judges whether the data is to the backhaul terminal, and directly forwards the data to the backhaul terminal without tunnel decapsulation, if the data is judged to be data to the backhaul terminal.

It can be seen from this embodiment that, in the technical solution according to the embodiment of the present invention, after the data is judged to be data from the backhaul terminal, the data is directly forwarded without tunnel encapsulation; and after the data is judged to be data to the backhaul terminal, the data is directly forwarded without tunnel decapsulation. Therefore, the bandwidth waste is reduced, and the transmission bandwidth is saved.

Technical solutions according to the embodiments of the present invention are further described in detail as follows.

Figure 3:
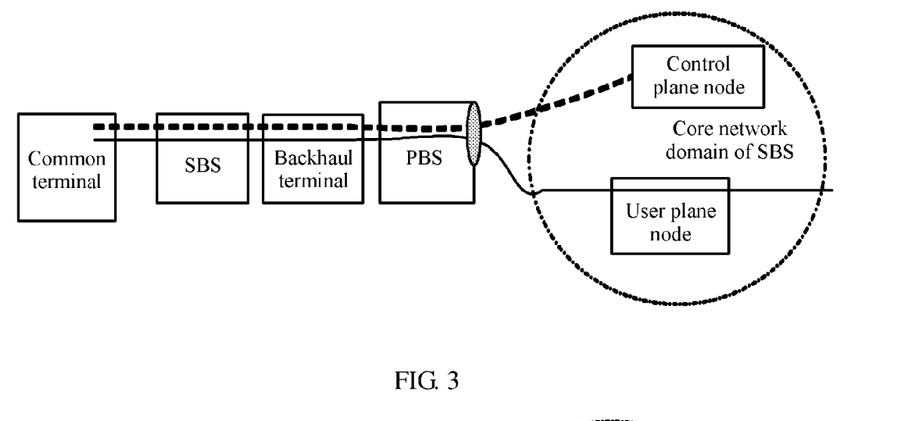
FIG. 3 is a schematic diagram of a data forwarding method according to an embodiment of the present invention.

FIG. 3 is a schematic diagram of a data forwarding method according to an embodiment of the present invention.

As shown in FIG. 3, a dashed line represents a control plane signaling flow, and a solid line represents a user plane data stream. A PBS and an SBS may use the same wireless mode or different wireless modes. After judging that the data (for example, the user plane data stream or the control plane signaling flow) is sent from a backhaul terminal, the PBS directly sends the data through a forwarding interface (the user plane data stream is sent to a user plane node of a core network domain of the SBS, and the control plane signaling flow is sent to a control plane node of the core network domain of the SBS) without tunnel encapsulation; as for a data stream from a common terminal, the PBS performs tunnel encapsulation by using an existing protocol, and then forwards the data to a core network domain of the PBS by a normal process. The PBS may, according to identification information of the backhaul terminal carried in the data, make judgment on the data sent from the backhaul terminal, or according to a corresponding relation of a user plane radio bearer and the backhaul terminal, make judgment on the data sent from the backhaul terminal when the user plane radio bearer receives the data. Therefore, the PBS transmits the data from the backhaul terminal without tunnel encapsulation, so as to save the transmission bandwidth; moreover, the data is directly sent to the core network domain of the SBS, so that the transmission delay is lowered, and the transmission efficiency is improved. This method imposes no impact on the data forwarding of an existing common terminal.

Figure 4:
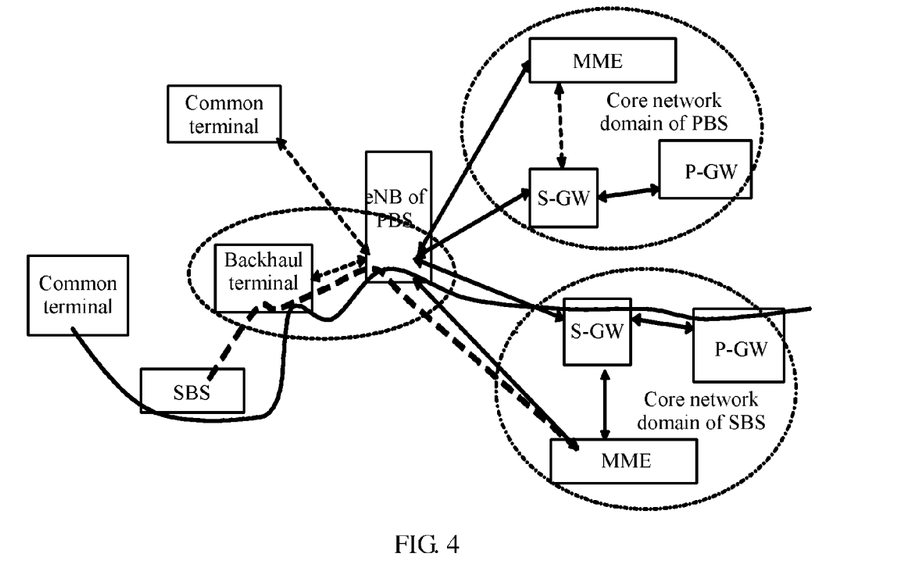
FIG. 4 is a specific schematic diagram of data forwarding in an LTE scenario according to an embodiment of the present invention.

FIG. 4 is a specific schematic diagram of data forwarding in an LTE scenario according to an embodiment of the present invention.

FIG. 4 is described with the LTE scenario as an example, where a PBS is an eNB, and an SBS is a Pico or Femto. In FIG. 4, a common terminal, an SBS, a backhaul terminal, a PBS, core network elements (an MME, an S-GW, and a P-GW) of the PBS, and core network elements (an MME, an S-GW, and a P-GW) of the SBS are included. In FIG. 4, a dashed line represents a control plane signaling flow, and a solid line represents a user plane data stream.

As for data from the backhaul terminal, the PBS directly sends the data through a forwarding interface according to a destination address, without tunnel encapsulation. When the data is a control plane signaling flow, without passing through the core network elements of the PBS, the data is directly forwarded to the core network element being the MME of the SBS; and when the data is a user plane data stream, without passing through the core network elements of the PBS, the data is directly sent to the core network elements being the S-GW and the P-GW of the SBS. As for data from a common terminal, the PBS performs tunnel encapsulation by using an existing protocol, and then forwards the data to the core network domain of the PBS according to a normal process. Therefore, the PBS transmits the data from the backhaul terminal without tunnel encapsulation, so as to save the transmission bandwidth; moreover, the data is directly forward to the core network element of the SBS without passing through the core network element of the PBS, so that the transmission delay is lowered, and the transmission efficiency is improved.

Furthermore, in terms of data sent to the backhaul terminal, the PBS directly classifies and maps the data to a radio bearer of a corresponding Quality of Service (QoS) level, for example, a user plane radio bearer, and then sends the data to the backhaul terminal without tunnel decapsulation.

Hereinafter, descriptions are made with examples specifically against forwarding processes of data streams in different directions in the LTE scenario, and it is assumed that the PBS and the SBS use the same wireless mode.

Figure 5:
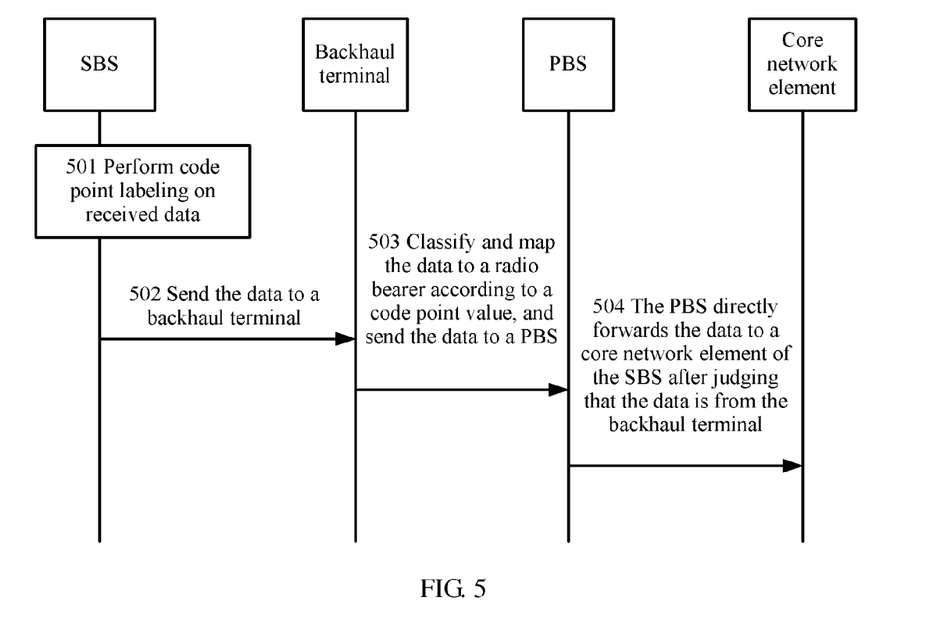
FIG. 5 is a flow chart of data forwarding in one direction in an LTE scenario according to an embodiment of the present invention.

FIG. 5 is a flow chart of data forwarding in one direction in the LTE scenario according to an embodiment of the present invention. The following steps are included in FIG. 5.

Step 501: An SBS performs code point labeling on received data.

An SBS performs code point labeling on received data, where the received data may be from a common terminal of the SBS.

The performing the code point labeling specifically includes the following.

As for a user plane data stream, differential code point labeling may be performed in a data header of the data stream according to a corresponding service type; as for a control plane signaling flow, including such as a signaling flow and a network management message from the SBS to a core network element, differential code point labeling may be performed in a data header of the data stream according to the priority.

The SBS may specifically perform the code point labeling on the data through a code point labeling function.

Step 502: The SBS sends the data with the code point labeling to a backhaul terminal.

Step 503: The backhaul terminal classifies and maps the data to a radio bearer according to a code point value, and sends the data to a PBS.

After receiving the data sent from the SBS, the backhaul terminal classifies and maps the data to an established radio bearer of a corresponding QoS level, for example, a user plane radio bearer, according to a code point value, and sends the data to a PBS.

Step 504: The PBS directly forwards the data to a core network element of the SBS after judging that the data is from the backhaul terminal.

The PBS establishes a corresponding relation between the user plane radio bearer and the backhaul terminal during procedure of establishing a user plane radio bearer. For example, the PBS establishes a corresponding relation table of the user plane radio bearer and the backhaul terminal, and further stores a corresponding relation between an address (for example, IP address) of the backhaul terminal and an address (for example, IP address) of the SBS. When the PBS receives the data from the backhaul terminal through the user plane radio bearer, the PBS judges that the data is from the backhaul terminal according to the corresponding relation between the user plane radio bearer and the backhaul terminal, and then directly forwards the data to a core network element of the SBS through an interface without tunnel encapsulation.

In addition, the data may further carry identification information of the backhaul terminal, so that after receiving the data, the PBS may judge that the data is from the backhaul terminal according to the identification information of the backhaul terminal carried in the data.

Data sent from a common terminal may also carry identification information of the common terminal, so that the PBS may judge that the data is sent from the common terminal according to the identification information. In addition, according to the corresponding relation table of the user plane radio bearer and the backhaul terminal, the PBS may also consider that the data is sent from a common terminal if the data is not received through a user plane radio bearer in the corresponding relation table. After judging that the data is from the common terminal, the PBS performs tunnel encapsulation by using an existing protocol, and then forwards the data to a target node according to a normal process.

It can be seen from the foregoing that, after judging that the data is from the backhaul terminal, the PBS directly forwards the data to the core network element of the SBS through the interface without tunnel encapsulation. Therefore, the data which is from the backhaul terminal and is sent from the PBS does not need tunnel encapsulation, so as to save the transmission bandwidth. In addition, the data is directly forwarded to the core network element of the SBS without passing through the core network element of the PBS, so that the transmission delay is reduced, and the transmission efficiency is improved.

Figure 6:
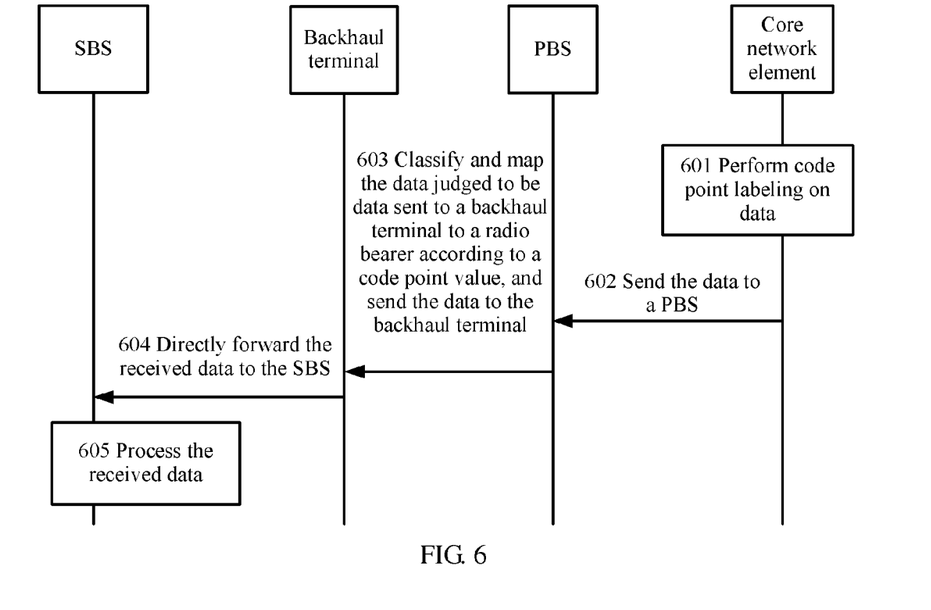
FIG. 6 is a flow chart of data forwarding in another direction in an LTE scenario according to an embodiment of the present invention.

FIG. 6 is a flow chart of data forwarding in another direction in the LTE scenario according to an embodiment of the present invention. The following steps are included in FIG. 6.

Step 601: A core network element of an SBS performs code point labeling on data.

According to an existing protocol, the core network element has a function of performing code point labeling on all data stream in a downlink direction. Therefore, in the embodiment of the present invention, the core network element of the SBS performs code point labeling (for example, differential code point labeling) on data. The code point labeling may be performed according to a service type and a priority.

Step 602: The core network element of the SBS sends the data with the code point labeling to a PBS.

The core network element sends the data with the code point labeling to a PBS.

Step 603: The PBS classifies and maps the data to a radio bearer according to a code point value after the data is judged to the data sent to a backhaul terminal, and sends the data to the backhaul terminal.

When establishing a radio bearer, for example, a user plane radio bearer, the PBS establishes a corresponding relation between the user plane radio bearer and the backhaul terminal. For example, the PBS establishes a corresponding relation table of the user plane radio bearer and the backhaul terminal, and further stores a corresponding relation between an address (for example, IP address) of the backhaul terminal and an address (for example, IP address) of the SBS.

After receiving the data, the PBS may compare a destination address (for example, a destination IP address) of the data with the address (for example, IP address) of the SBS. If the addresses are the same, the PBS may determine that the data is to the backhaul terminal, and map the data to the user plane radio bearer according to a code point value, and then send the data to the backhaul terminal corresponding to the address of the SBS. In addition, identification information identifying that the data is sent to the backhaul terminal may be carried in the data, and the PBS makes judgment on the data according to the identification information.

Specifically, after receiving the data, the PBS may not perform tunnel decapsulation on the data which is sent to the backhaul terminal, and map the data to the established user plane radio bearer of a corresponding QoS level, so as to send the data to the backhaul terminal. As for data to a common terminal, after the tunnel decapsulation, the data is forwarded to a common terminal according to a normal process. Identification information identifying that the data is sent to a common terminal may also be carried in the data, so that the PBS may make judgment on the data according to the identification information.

Step 604: The backhaul terminal directly forwards the received data to the SBS.

After receiving the data, which is sent from the PBS, through the user plane radio bearer, the backhaul terminal directly forwards the data to the SBS.

Step 605: The SBS processes the received data.

After receiving the data, the SBS processes the data according to a normal processing process.

It should be noted that, the descriptions above are made with the LTE scenario as an example; however, the present invention is not limited thereto. The present invention is also applicable in a WiMAX scenario, and processes are essentially the same except that eNB of LTE in the process is replaced by an eBS of the WiMAX.

In addition, the embodiment of the present invention may be directed to a case that the PBS and SBS share a common core network, and may also be applicable in a case that the PBS and the SBS do not share a common core network.

In addition, the embodiment of the present invention may also be applicable in a case that the PBS and the SBS adopt different wireless modes. For example, the SBS uses Wireless Fidelity (WiFi) or other wireless modes such as 2G, and 3G, and the PBS uses a wireless mode such as LTE or WiMAX.

It can be seen from foregoing that, the PBS does not perform tunnel decapsulation on data after the data is judged to be the data sent to the backhaul terminal, and directly maps the data to the established user plane radio bearer, so as to send the data to the backhaul terminal. In this way, the processing time is saved, and the processing process becomes much simpler.

The method for realizing data forwarding according to the embodiments of the present invention is described in detail above, and correspondingly, embodiments of the present invention further provide a related device and a network system.

Figure 7:
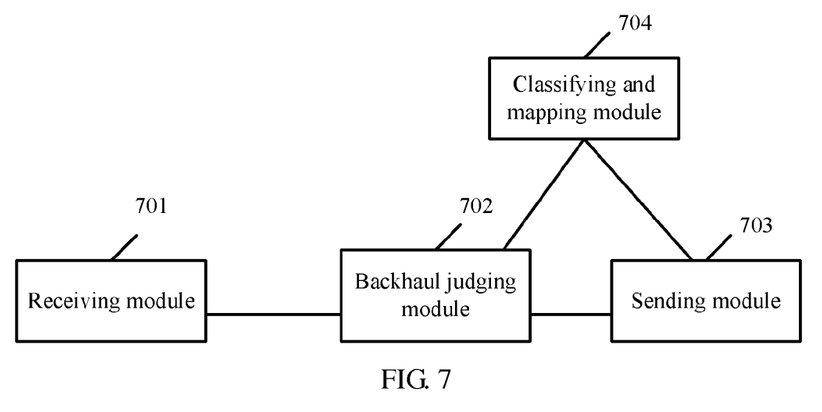
FIG. 7 is a schematic structure diagram of a PBS according to an embodiment of the present invention.

FIG. 7 is a schematic structure diagram of a PBS according to an embodiment of the present invention.

As shown in FIG. 7, the PBS includes:

a receiving module 701, configured to receive data sent from an external device;

a backhaul judging module 702, configured to judge whether the data is from or to a backhaul terminal; and a sending module 703, configured to directly forward the data after the backhaul judging module 702 judges that the data is from or to the backhaul terminal.

A case that data is forwarded in one direction is as follows:

The receiving module 701 is specifically configured to receive data, on which the SBS performs code point labeling, and which is sent by the SBS to the backhaul terminal, classified and mapped by the backhaul terminal to a corresponding radio bearer according to a code point value obtained after the code point labeling performed by the SBS, and sent by the backhaul terminal.

The backhaul judging module 702 is specifically configured to judge whether the data is from the backhaul terminal according to identification information of the backhaul terminal carried in the data; or judge whether the data is from the backhaul terminal according to a pre-stored corresponding relation between the radio bearer and the backhaul terminal.

A case that data is forwarded in another direction is as follows:

The receiving module 701 is specifically configured to receive data sent after code point labeling is performed on the data by a core network element. The backhaul judging module 702 is specifically configured to judge whether the data is the data to the backhaul terminal according to identification information identifying that the data is to the backhaul terminal carried in the data; or judge whether the data is to the backhaul terminal according to a comparison result after a destination address carried in the data and a pre-stored address of the SBS corresponding to an address of the backhaul terminal are compared.

The PBS may further include a classifying and mapping module 704, configured to directly classify and map, according to a code point value obtained after the code point labeling is performed by the core network element, the downlink data to a corresponding radio bearer for being sent to the backhaul terminal by the sending module 703.

Figure 8:
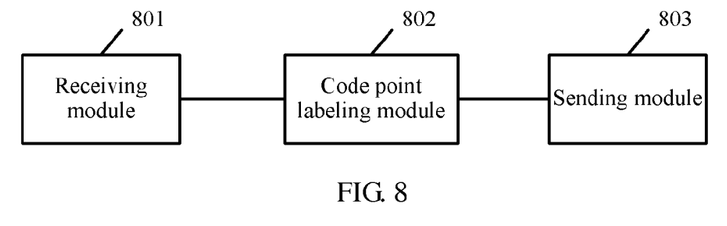
FIG. 8 is a schematic structure diagram of an SBS according to an embodiment of the present invention.

FIG. 8 is a schematic structure diagram of an SBS according to an embodiment of the present invention.

As shown in FIG. 8, the SBS includes:

a receiving module 801, configured to receive data sent from an external device;

a code point labeling module 802, configured to perform code point labeling on the data; and a sending module 803, configured to send the data with the code point labeling to a backhaul terminal, where the backhaul terminal forwards the data to a PBS, and the PBS judges that the data is from the backhaul terminal, and then directly forwards the data.

The data received by the receiving module 801 may be from a common terminal belonging to the SBS. The code point labeling module 802 specifically performs differential code point labeling on all data which is to the backhaul terminal.

Figure 9:
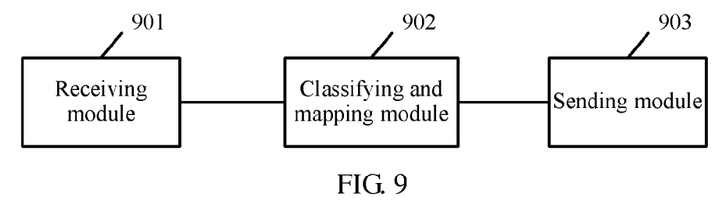
FIG. 9 is a schematic structure diagram of a backhaul terminal according to an embodiment of the present invention.

FIG. 9 is a schematic structure diagram of a backhaul terminal according to an embodiment of the present invention.

As shown in FIG. 9, the backhaul terminal includes:

a receiving module 901, configured to receive data with code point labeling;

a classifying and mapping module 902, configured to classify and map the data to a corresponding radio bearer according to a code point value obtained after the code point labeling is performed; and a sending module 903, configured to send the data classified and mapped by the classifying and mapping module 902 to a PBS, where the PBS judges that the uplink data is from the backhaul terminal, and then directly forwards the data.

The classifying and mapping module 902 may support to classify and map the data, on which the code point labeling is performed and which is sent from the SBS, to an established wireless bearer of a corresponding QoS level, for example a user plane radio bearer.

Figure 10:
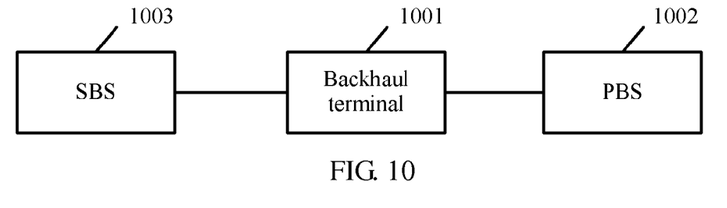
FIG. 10 is a schematic structure diagram of a network system according to an embodiment of the present invention.

FIG. 10 is a schematic structure diagram of a network system according to an embodiment of the present invention.

As shown in FIG. 10, the network system includes:

a backhaul terminal 1001, configured to send or receive data; and a PBS 1002, configured to receive data sent from an external device; judge whether the data is from or to the backhaul terminal 1001, and directly forward the data if the data is from or to the backhaul terminal 1001.

The network system further includes:

an SBS 1003, configured to send data with code point labeling to the backhaul terminal 1001; and the backhaul terminal 1001 is specifically configured to classify and map the received data to a corresponding radio bearer according to a code point value obtained after the code point labeling is performed, and send the data to the PBS 1002. It should be noted that a wireless mode used by the SBS 1003 may be the same as or different from that adopted by the PBS 1002.

For specific structures of the backhaul terminal 1001, the PBS 1002, and the SBS 1003, reference may be made to the forgoing descriptions.

Figure 11:
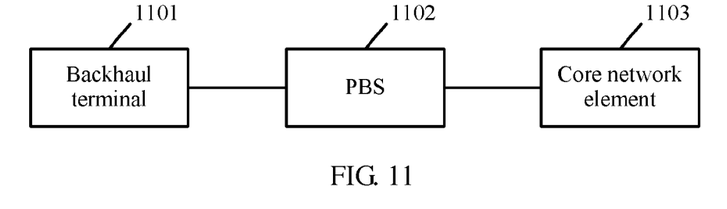
FIG. 11 is a schematic structure diagram of another network system according to an embodiment of the present invention.

FIG. 11 is a schematic structure diagram of another network system according to an embodiment of the present invention.

As shown in FIG. 11, the network system includes:

a backhaul terminal 1101, configured to send or receive data; and a PBS 1102, configured to receive data sent from an external device; judge whether the data is from or to the backhaul terminal 1101, and directly forward the data if the data is from or to the backhaul terminal 1101.

The network system further includes:

a core network element 1103, configured to send data with code point labeling to the PBS 1102.

The PBS 1102 is specifically configured to receive the data sent from the core network element 1103 after the code point labeling is performed on the data; judge whether the data is to the backhaul terminal 1101, if the data is to the backhaul terminal 1101, directly classify and map the data to a corresponding radio bearer according to a code point value obtained after the code point labeling is performed, and then send the data to the backhaul terminal 1101. For specific structures of the backhaul terminal 1101 and the PBS 1102, reference may be made to the forgoing descriptions.

To sum up, in the technical solutions according to the embodiment of the present invention, the data is directly forwarded without tunnel encapsulation after the data is judged to be the data from the backhaul terminal, and the data is directly forwarded without tunnel decapsulation after the data is judged to be the data to the backhaul terminal. In this way, the bandwidth waste is reduced, and the transmission bandwidth is saved.

In addition, in the technical solutions according to the embodiment of the present invention, the data from the backhaul terminal is directly forwarded to the core network element of the SBS without passing through the core network element of the PBS, so as to decrease the transmission delay and improve the transmission efficiency. As for the data to the backhaul terminal, the downlink data is directly mapped to the established user plane radio bearer without tunnel decapsulation, so as to be sent to the backhaul terminal. Therefore, the processing time is saved, and the processing process becomes much simple.

Persons of ordinary skill in the art can understand that all or part of steps in the method of the above embodiments may be implemented by programs instructing relevant hardware, and the programs may be stored in a computer readable storage medium, such as a Read-Only Memory (ROM), a magnetic disc, or an optical disc.

The method for realizing data forwarding, the network system, and the device according to embodiments of the present invention are described in detail above. The principle and implementation of the present invention are described herein through specific embodiments. The description about the embodiments is merely provided for better understanding the method and the core ideals of the present invention. Persons of ordinary skill in the art can make variations to the present invention in terms of the specific implementations and application scopes according to the ideas of the present invention. Therefore, the specification shall not be construed as a limit to the present invention.

What is claimed is:

1. A method for realizing data forwarding by a Base Station, comprising:

receiving, by the base station, data; and after receiving, by the base station, the data, judging by the base station whether the data is from a backhaul terminal or to the backhaul terminal from a core network element, if judged, by the base station, that the data is from the backhaul terminal, directly forwarding the data to the core network element without tunnel encapsulation or if judged, by the base station, that the data is from the core network element to the backhaul terminal, directly forwarding the data to the backhaul terminal without tunnel decapsulation, wherein the data received from the backhaul terminal is classified and mapped by the backhaul terminal to a corresponding radio bearer according to a code point value obtained after code point labeling performed by a Secondary Base Station and the judging of whether the data is from the backhaul terminal is according to the corresponding relation between the radio bearer and the backhaul terminal, and wherein the judging of whether the data is to the backhaul terminal is according to a comparison result of comparing a destination address carried in the data and an address of a Secondary Base Station corresponding to an address of the backhaul terminal.

2. The method for realizing data forwarding according to claim 1, wherein the core network element is for the Secondary Base Station.

3. The method for realizing data forwarding according to claim 1, wherein the judging whether the data is from the backhaul terminal comprises:

judging whether the data is from the backhaul terminal according to identification information of the backhaul terminal carried in the data.

4. The method for realizing data forwarding according to claim 1, wherein the judging whether the data is to the backhaul terminal comprises:

judging whether the data is to the backhaul terminal according to identification information identifying that the data is to the backhaul terminal carried in the data.

5. The method for realizing data forwarding according to claim 1, wherein the core network element is for the Secondary Base Station, and wherein the data is data which is sent by the core network element after code point labeling is performed by the core network element; and the directly forwarding the data from the core network element to the backhaul terminal comprises:

directly classifying and mapping the data to a corresponding radio bearer according to a code point value obtained after the code point labeling is performed by the core network element.

6. A Base Station, comprising:

a receiving module, configured to receive data;

a backhaul judging module, configured to judge whether the data received by the receiving module is from a backhaul terminal or to the backhaul terminal from a core network element; and a sending module, configured to directly forward the data to the core network element without tunnel encapsulation after the backhaul judging module judges that the data is from the backhaul terminal or directly forward the data to the backhaul terminal without tunnel decapsulation after the backhaul judging module judges that the data is from the core network element to the backhaul terminal, wherein the data received from the backhaul terminal is classified and mapped by the backhaul terminal to a corresponding radio bearer according to a code point value obtained after code point labeling performed by a Secondary Base Station and the backhaul judging module is configured to judge whether the data is from the backhaul terminal according to the corresponding relation between the radio bearer and the backhaul terminal, and wherein the backhaul judging module is configured to judge whether the data is to the backhaul terminal according to a comparison result of comparing a destination address carried in the data and an address of a Secondary Base Station corresponding to an address of the backhaul terminal.

7. The Base Station according to claim 6, wherein
the backhaul judging module is configured to judge whether the data is from the backhaul terminal according to identification information of the backhaul terminal carried in the data.

8. The Base Station according to claim 6, wherein
the receiving module is configured to receive data sent by the core network element after code point labeling is performed on the data by the core network element.

9. The Base Station according to claim 6, wherein
the backhaul judging module is configured to judge whether the data is to the backhaul terminal according to identification information identifying that the data is to the backhaul terminal carried in the data.

10. The Base Station according to claim 8, wherein the core network element is for the Secondary Base Station, and further comprising:

a classifying and mapping module, configured to directly classify and map the data to a corresponding radio bearer according to a code point value obtained after the code point labeling is performed by the core network element, for the directly forwarding of the data from the core network element to the backhaul terminal by the sending module.

11. The Base Station according to claim 6, wherein the code network element is for the Secondary Base Station.

* * * * *